No. 891,784. PATENTED JUNE 23, 1908.
S. S. SEYFERT.
SINGLE PHASE COMMUTATOR MOTOR.
APPLICATION FILED JAN. 31, 1905.
5 SHEETS—SHEET 1.
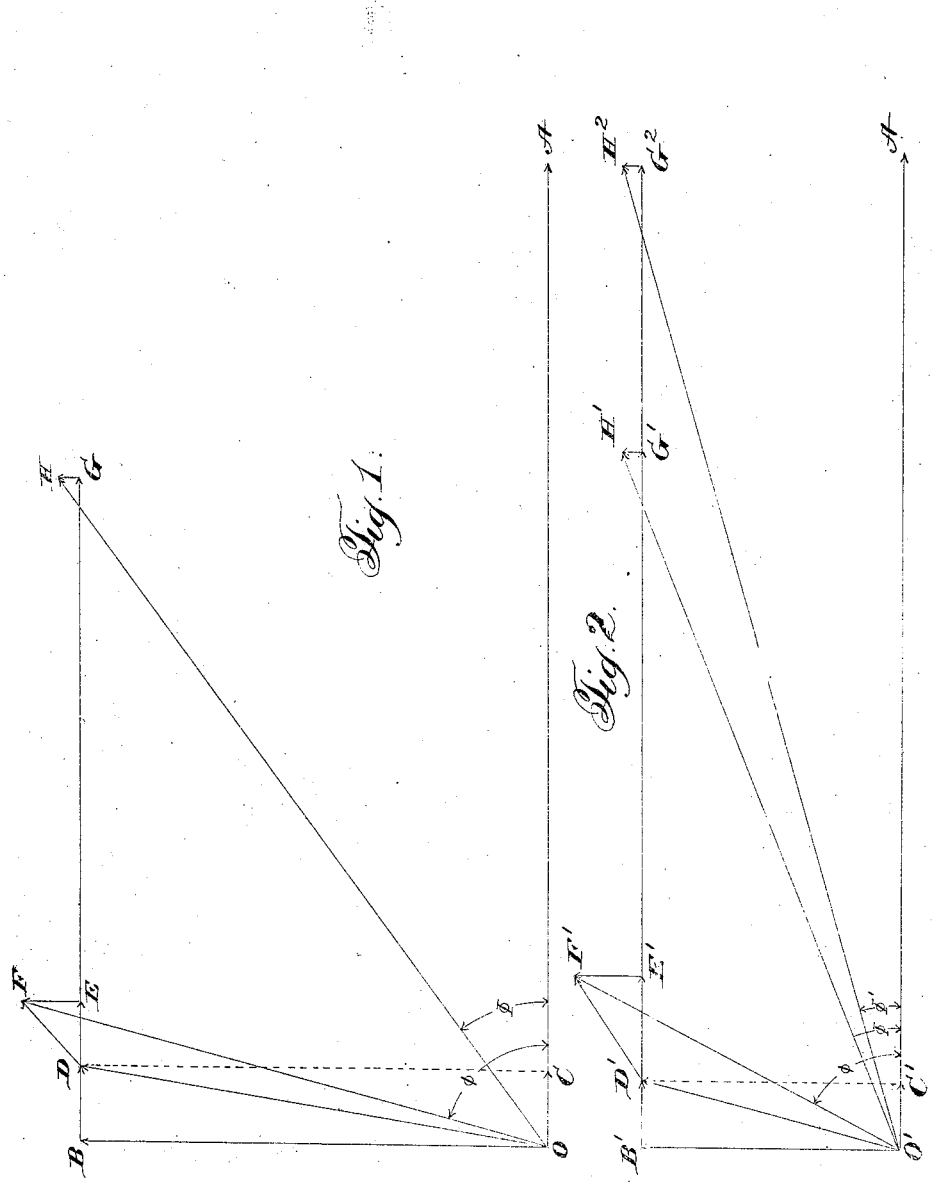
Witnesses:
Jas. E. Hutchinson.
J. L. Lawlor.
Inventor:
Stanley S. Seyfert.
by Prindle and Williamson, Attorneys No. 891,784. PATENTED JUNE 23, 1908.
S. S. SEYFERT.
SINGLE PHASE COMMUTATOR MOTOR.
APPLICATION FILED JAN. 31, 1905.

5 SHEETS—SHEET 2.

Witnesses
Jas. E. Hutchinson
J. L. Lawlor

Inventor:
Stanley S. Seyfert,
by Prindle & Williamson, Attorneys:

No. 891,784. PATENTED JUNE 23, 1908.
S. S. SEYFERT.
SINGLE-PHASE COMMUTATOR MOTOR.
APPLICATION FILED JAN. 31, 1905.

5 SHEETS—SHEET 3.

No. 891,784. PATENTED JUNE 23, 1908.
S. S. SEYFERT.
SINGLE PHASE COMMUTATOR MOTOR.
APPLICATION FILED JAN. 31, 1905.

5 SHEETS—SHEET 4.

Witnesses:
Jas E Hutchinson
Geo. B. Prindle

Inventor:
Stanley S. Seyfert,
By Prindle and Williamson Attorneys.

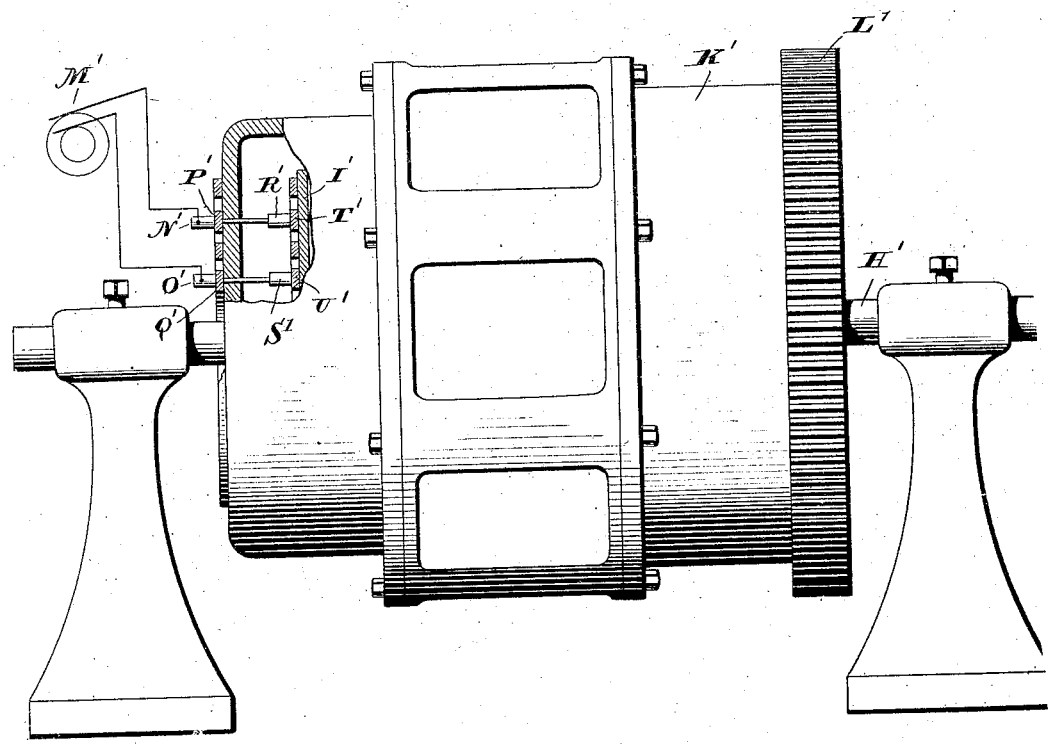

UNITED STATES PATENT OFFICE.

STANLEY S. SEYFERT, OF SOUTH BETHLEHEM, PENNSYLVANIA, ASSIGNOR OF ONE-HALF TO WILLIAM S. FRANKLIN, OF SOUTH BETHLEHEM, PENNSYLVANIA.

SINGLE-PHASE COMMUTATOR-MOTOR.

No. 891,784.        Specification of Letters Patent.        Patented June 23, 1908.

Application filed January 31, 1905. Serial No. 243,483.

*To all whom it may concern:*

Be it known that I, STANLEY S. SEYFERT, of South Bethlehem, in the county of Northampton, and in the State of Pennsylvania, have invented a certain new and useful Improvement in Single-Phase Commutator-Motors, and do hereby declare that the following is a full, clear, and exact description thereof, reference being had to the accompanying drawings, in which—

Figure 3:
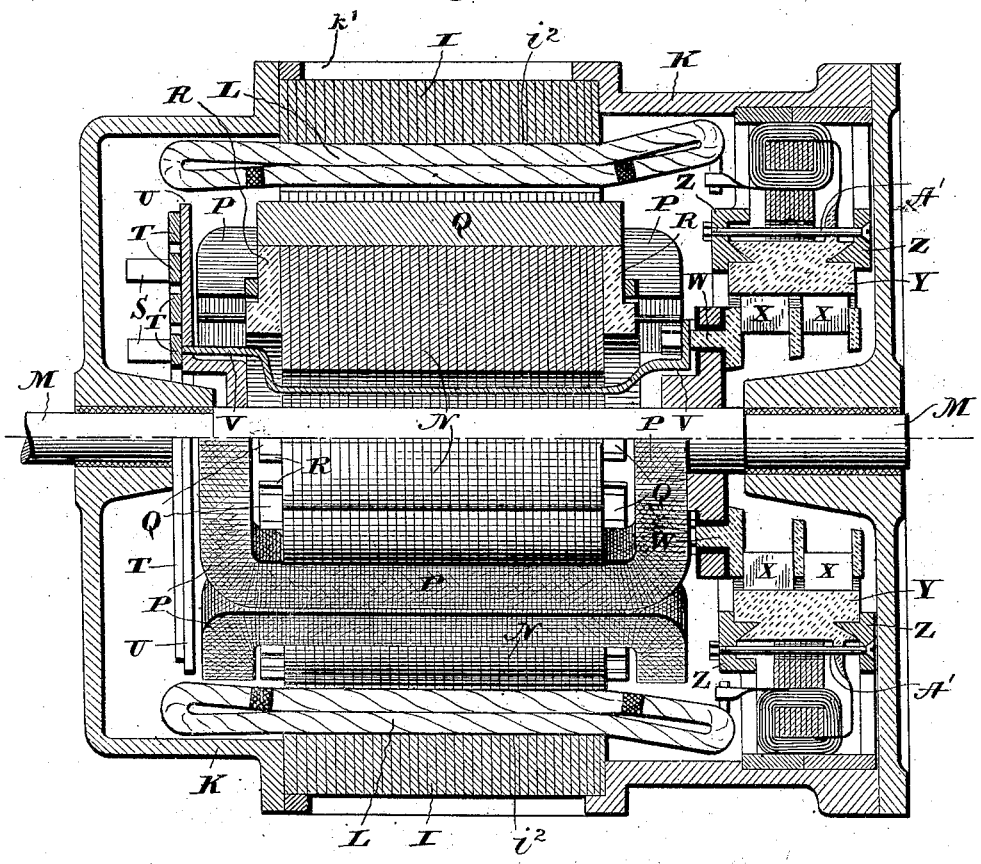
Figure 4:
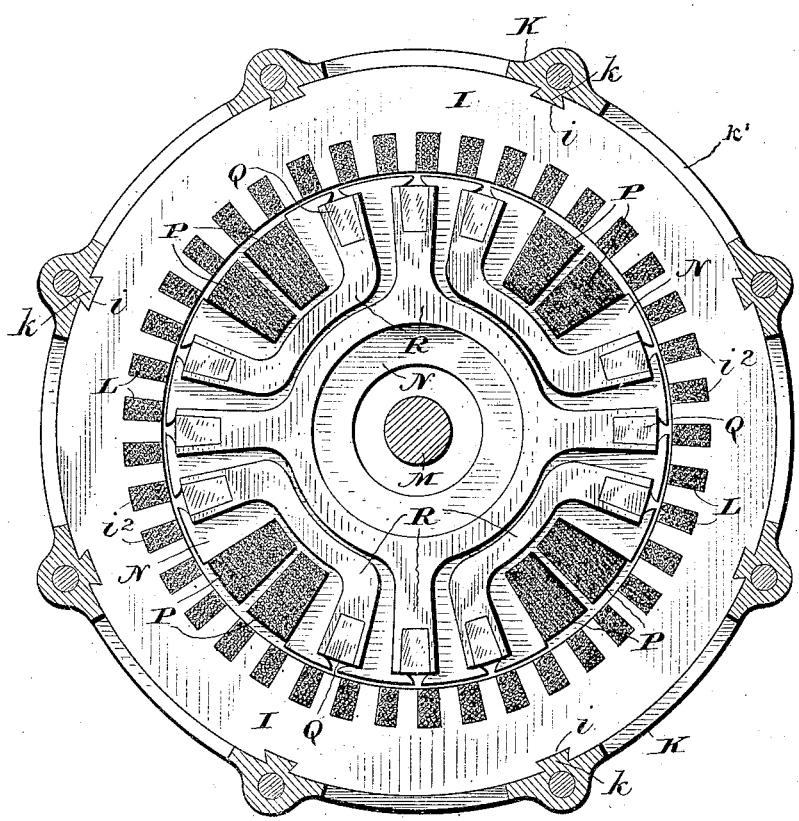
Figure 5:
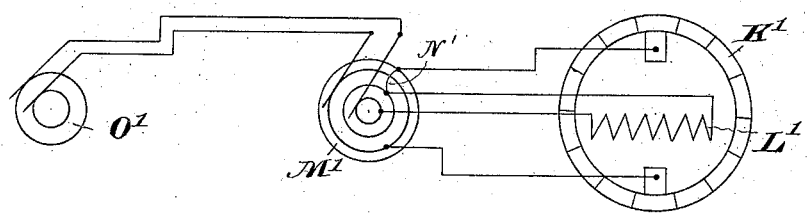
Figure 6:
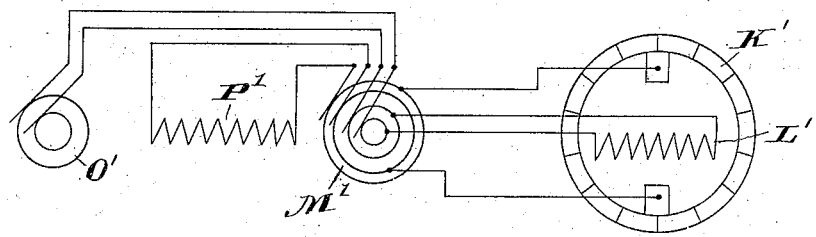

Figures 1 and 2 are diagrams illustrating the relations between voltage and current in a single phase motor, under different conditions; Figs. 3 and 4 are, respectively, transverse and longitudinal sectional views of a motor embodying my invention; Fig. 5 is a diagrammatic view of the connections of my motor when used as illustrated in Figs. 1 to 4; Fig. 6 is a diagrammatic view of the connections of my motor when used as a repulsion motor; and Fig. 7 is an elevation of that form of my invention in which the internal field is stationary, and the external armature revolves.

The object of my invention has been to provide a single phase commutator motor of high efficiency, light weight, and small size, and to such ends, my invention—consists in the single phase commutator motor hereinafter specified.

Single-phase motors have heretofore been subject to several very serious disadvantages, as compared to the direct-current motor.

First, their power factor is low, owing to the comparatively great inductance of the field and armature coils of the motor. Because of this inductance, the current falls far behind the electromotive force of supply in phase, and the current must reach much greater values to correspond to a certain horse-power developed in the motor, which necessitates the use of transmission wires of greater cross-section than if the power factor were good.

Second, the weight of the alternating current motor is much greater for a certain power rating than of the direct current motor. This is due to the fact that lower flux densities are employed in the iron of the alternating current motor than in the direct current motor to reduce the core losses. As more iron must be employed in the alternating than in the direct current motor, and, as the space on an electric car which can be de-
voted to a motor is limited by height of the floor, the horse-power of an alternating current motor of the types prior to mine for such purposes, have been limited as compared with the direct current motor. It will, therefore, be seen that, to reduce the size and weight of the alternating current motor without impairing its power rating and efficiency is very desirable.

In the series motor for alternating currents, when the machine is running, a certain portion of the electromotive force of supply is used in overcoming the impedance of the field; another portion in overcoming that of the armature, while the remainder balances the counter electromotive force induced in the armature by rotation. This is illustrated in Fig. 1, in which, when the motor is starting and there is, consequently, no counter electromotive force, if the current be represented by the vector O A; the voltage lost through inductance of the field coils by O B; the voltage lost through the resistance of the field coils by O C; then the line O D represents the total voltage consumed by the field. If, now, a short-circuited winding be placed on the field member so as to act as a short-circuited secondary with the armature coils as primary, the inductance of the armature can, with the exception of the small amount due to leakage of flux, be counteracted. Such short-circuited secondary is termed a "compensating winding", and the armature coacting therewith is termed a "compensated armature". Referring still to Fig. 1, the line E F represents the voltage lost in the armature due to the leakage inductance only, and the line D E represents that lost through resistance of the armature. The line D F then represents the total voltage consumed by the armature at starting, and O F represents the total starting voltage of the motor. The counter-electromotive force which is introduced in the armature when the motor is running, is represented by the line E G. If the current be unchanged, the field voltage will remain the same, and the line O H will represent the running voltage. The line G H will represent the voltage lost in armature, due to leakage reactance. It will be observed that as the line E—F represents loss of voltage, due to leakage inductance at starting, and as the line G—H represents that when running, the latter is smaller than the former, because the alternations of the current in the armature decrease in frequency, as the motor speed increases.

Let cosine $\Phi$ represent the power factor at the given speed of rotation. In order to make the power factor as large as possible, the angle $\Phi$ must be reduced as much as possible. This may be done, as will be seen by Fig. 1, (1) by decreasing the inductance of the field coils; or (2) by decreasing the armature inductance. The armature inductance, having already been reduced by the compensating windings, is very small in amount, and, therefore, improvement must take the direction of reducing the field inductance.

Since the power of the motor is proportional to the product of the field strength by the armature ampere turns, one way to better the power factor, cosine $\Phi$, of the motor, is to weaken the field (so as to get less inductive drop) and strengthen the armature (strengthening the armature involving no disadvantage since its induction may be compensated). With a certain diameter of rotating armature, as universally used in these motors, the only way to increase the armature ampere turns is to deepen the slots in the armature core, but, as the slots approach each other as they are extended toward the center of the core (the slots lying in a radial direction) they cannot be materially deepened beyond present practice, without their being run together and cutting off the teeth formed between them. Therefore, it is impracticable to increase the armature ampere turns by deepening the slots on the single phase motors heretofore used.

The third way in which the power factor cosine $\Phi$ can be increased is by increasing the counter-electromotive force. The induced counter-electromotive force is the most important element in determining the power factor of the motor when running, since such electromotive force is always in phase with the current, and the power factor would be unity if such counter-electromotive force were the only one acting. The greater this counterelectromotive force is, as compared with the electromotive force lost by inductance, the better the power factor of the motor. Therefore, it will be seen that, as above stated, the power factor can be increased by increasing the induced counter-electromotive force. This may be done either (1) by strengthening the field; or (2) by increasing the number of turns on the armature. The first method is impracticable, because strengthening the field would increase the inductive drop in the field correspondingly, so that nothing would be gained. The second method; namely, strengthening the armature, is unobjectionable, since the armature may be compensated and the increased inductance counteracted. This method is, however, impracticable except to a limited extent with alternating current motors as constructed previous to mine, because, as has been stated, it can only be done with an armature of a given size by deepening the slots in the armature core, and that would result in cutting off the teeth between the slots.

In Fig. 2 are illustrated the voltages for a motor in which the field coils have been weakened, while the armature has been strengthened, and the increased value of cosine $\Phi$ is evident. The line O' H² represents the running voltage when the counter-electromotive force has been increased the amount represented by the line G' G².

In the case of an alternating current motor, then, a weak field is desired, as compared to the armature. This is diametrically the opposite of what is desired in a direct current motor, where a strong field and a weak armature are required, so as to avoid armature reaction as much as possible.

So far as I am aware, single phase alternating current motors of the direct current type have all been built with internal armatures and stationary external fields. All compensated alternating current motors, previous to mine, so far as I am aware have been built with internal armatures. I have found that the power factor of a single-phase alternating-current motor can be very advantageously increased by changing the relative positions of the field and armature, making the field the rotating member, and the armature the stationary member, with other necessary alterations, whereby a remarkable increase of efficiency, without increase in weight, can be obtained. The changing of the relative positions of field and armature in the alternating current commutating motor produces advantages which belong solely to this class of motor.

In carrying my invention into practice, I provide, as illustrated in Figs. 3 and 4, a stationary armature core I, consisting preferably of sheet-metal disks or laminations. The disks are secured to the casing K, as by dove-tail slots $i$ which engage dove-tails $k$ on the casing. The casing is provided with openings $k'$, through which heat may radiate from the armature core. The armature core is provided with notches $i^2$, which are adapted to receive the armature bars L. As the notches $i^2$ radiate outward from their entrances, it is evident that the teeth between the notches increase in cross-section, instead of decreasing in cross-section in the direction toward the bottom of said slots, so that the flux density in such teeth is nowhere greater than at their ends. A shaft M is mounted in bearings in the casing and carries a rotating field N.

In Fig. 3 the upper half of the field is shown in cross-section, while the lower half is shown in elevation. The field is preferably laminated in the usual way, and is provided with the usual field coils P. Bars Q are set in notches in the field core and are provided with connections R to form compensating windings for counteracting the inductance of the armature. Current is communicated to the motor and taken from it through brushes S which, respectively, bear upon collector rings T (there being four rings and brushes in the case of a repulsion motor, and two in the case of a series motor.) The collector rings are mounted upon a disk U that is carried by the shaft, and they have connections V with brush holders W that are mounted upon the shaft M and rotate with the field, carrying brushes X. In the instance chosen for illustration, two of the rings T correspond to the brush leads, while the other two correspond to the field terminals. The brushes rotate within an internal commutator consisting of bars Y which are clamped between plates Z by bolts A'. The commutator bars are connected with the armature coils by means whose theory will not be explained in the present case, since they are the subject of another application, filed by me February 20th, 1905, Serial No. 246,587 and the object of which is to overcome the objectionable sparking under the brushes at the face of the commutator.

In Fig. 5 the windings are supposed to be connected in series, and therefore but two rings T of each set are supplied with brushes, the remaining two rings of each set being connected together by a bridge piece N'. The large ring K', divided as a commutator, represents the commutator of an armature. The coil L' within the large ring represents the field. The concentric rings M' at the center of the diagram represent the collector rings T, and the two concentric rings O' represent the source of supply.

In Fig. 6, the connections are illustrated when the machine is operated as a repulsion motor, each of the four rings T, represented in the diagram by the rings M', being supplied with a brush. The conventions of this diagram are the same as those illustrated in Fig. 5, and it will be noted that the bridge piece N' is omitted; the source of supply O' is connected to the brushes which bear upon the rings M' connected with the field, while the rings M' to which the commutator brushes are connected, are connected with a resistance P', so that a circuit of the armature through the brushes is closed through the resistance.

The advantages in a single-phase commutator motor arising from the placing of the field inside the armature are numerous and fundamental. The field core can be made as small as desired, and can have as small a core as may be wished. The depth of the slots in the armature may be increased indefinitely, without cutting off the armature teeth, (since the slots extend farther away from each other the deeper they are formed) and thus the armature ampere turns can be increased indefinitely. The amount of field copper is very much less with my motor than with an alternating current motor in which the field is external to the armature. For a certain size and weight of motor, the power or rating of the motor is very largely increased (as compared to the external field). For the same peripherial speed, the revolutions per minute are decreased by the use of the internal field, in spite of the fact that the output is greater. This means a slower speed motor, and, therefore, a smaller gear ratio and greater gear efficiency. Because of the greater amount of space available for armature slots, the armature ampere turns may be largely increased for the same size and weight of motor, by making the armature external. The tangential magnetic drag on the rotor is thus increased in the same ratio (the field flux being the same in each case), and the torque is greater both on this account and on account of the greater diameter of the rotor which is permitted.

Because of the increase in armature ampere turns made possible by the new arrangement, the counter-electromotive force of the armature becomes comparatively greater, and hence a better power factor (cosine $\Phi$) is obtained at all loads.

Because of the increase in armature ampere turns, the inductive voltage component of the armature is made greater, while that of the field may be correspondingly decreased, without altering the power of the motor, but, since the armature inductance may be compensated, this means a better power factor for the motor.

By making the field internal, the leakage of field flux is less, and hence a lower inductive component of the field voltage results, and a better power factor is obtained. This is due, first, to the fact that, with the internal field, diverging poles are obtained; whereas, with the external field, converging poles are obtained; and second, to the fact that the flux density in the air gap is a great deal lower with the internal field than with the external field. When it is considered that the leakage flux is a large proportion of the total field flux, the effect on the inductance of the field coil can be seen.

With the internal field, the ratio of armature ampere turns to field ampere turns may be increased to almost any desired amount, because the armature is free and unrestricted in its dimensions; that is, the slots can be made of any desired depth, without thinning the teeth, the teeth, in fact, growing thicker with the greater depth of slot.

With the internal field there is greater ease in getting the necessary area for slots for compensating winding, because the field poles can have a greater peripheral width for the same size and weight of motor.

The compensating turns can be a great deal shorter with the internal field than with the external field, and hence, for the same amount of copper a better compensation is obtained with the internal field. This is true, first, because the turns may be given greater sectional area (being shorter) for the same amount of copper; and, second, because their resistance is less on account of their shorter length, and hence the flux necessary to induce the compensating currents is greatly reduced, which means better compensation and better power factor.

In my motor there is very much more room than usual for resistance leads and choking devices of any sort that may be used to make possible satisfactory commutation. This room is in the space outside the commutator. Here, too, the resistance leads have better radiating facilities and are much more accessible for repair.

My satisfactory armature arrangement makes possible the removal of the commutator from the motor proper, with the attendant great advantage of increased available space.

With the internal field, the field core, which is the seat of constant iron loss is greatly reduced in volume, without increasing the flux density in the same. In spite of the higher power obtained with the internal field, the iron loss is reduced below that of the external field.

The armature iron, which is the seat of the variable iron loss, is increased in volume in the case of the internal field, but the average total iron loss for different speeds is not greater with the internal field than with the external field. The armature, being external, is best suited for radiating heat.

It is obvious that various changes can be made in the above-illustrated construction, which will be within the scope of my invention. For instance, the armature may rotate while the field is held stationary, the armature being external to the field as before described. This form of my invention is illustrated in Fig. 7. In such figure the motor is mounted on a stationary shaft H'. This shaft has fixed to it the internal stationary field I'. The external rotating armature K' turns on the shaft and is provided with a gear wheel L', by which power can be taken from the motor. Current is supplied from the alternator M' to brushes N' and O', the latter contacting with slip rings P' and Q' respectively. These slip rings are connected with brushes R' and S' respectively, which rotate with the field, and the brushes complete the circuit with the armature through slip rings T' and U' on the armature.

Having thus described my invention, what I claim is:—

1. An alternating current commutator motor, comprising the combination of an external armature, a commutator therefor, and an internal uncommutated field.

2. In an alternating current commutator motor, the combination of an external member, a commutator connected thereto and stationary with respect thereto, and an internal uncommutated member.

3. In an alternating current commutator motor, the combination of an external stationary member, a commutator connected thereto, and stationary with respect thereto, an internal rotating uncommutated member, and a source of alternating current.

4. The combination with a source of alternating current and a device consisting of internal and external relatively rotatable members, a commutator attached to the external member and brushes attached to the internal member, both members in the normal use of the device being in continuous circuit with said source of current, said parts being so connected that the magnetic poles of the armature shall rotate relative thereto.

5. The combination of a source of alternating current and a device consisting of an internal uncommutated member and an external commutated member, both members in the normal use of the device being in continuous circuit with said source of current, said parts being so connected that the magnetic poles of the commutated member shall rotate relative thereto, the sole function of said combination being the conversion of electrical into mechanical energy.

6. The combination of a source of alternating current and a device consisting of an internal and an external member, said external member having a continuous coil, or series of coils, a commutator having each bar separately connected with said continuous coil or series of coils, both said external and internal member in the normal use of the device being in continuous circuit with said source of current, said parts being so connected that the magnetic poles of the armature shall rotate relative thereto.

7. The combination with an alternating circuit, of a motor comprising two elements, one external to the other, said elements being relatively rotatable, said elements being connected to said circuit, means for commutating the current of said external element, and means for compensating the inductance of the external element, said parts being so connected that the magnetic poles of the armature shall rotate relative thereto.

8. The combination with a source of alternating current, of a motor consisting of internal and external mutually inductive elements, relatively rotatable, a commutator connected with said external element, the alternating current being supplied to the internal member without commutation, and means for compensating the inductance of the external element, said parts being so connected that the magnetic poles of the armature shall rotate relative thereto.

9. A motor consisting of the combination of internal and external mutually inductive elements, relatively rotatable, a commutator connected with said external element, said internal element being adapted to receive alternating current without commutation, and means on said internal element for compensating the inductance on said external element, said parts being so connected that the magnetic poles of the armature shall rotate relative thereto.

10. The combination with a source of alternating current, of a motor consisting of internal and external mutually inductive elements, relatively rotatable, a commutator connected with said external element, and means on said internal element for compensating the inductance of said external element, said parts being so connected that the magnetic poles of the armature shall rotate relative thereto.

11. In an alternating current commutator motor, the combination of an internal compensating member, an external compensated member, commutating connection between said members, and means for supplying alternating current to said compensated member, said parts being so connected that the magnetic poles of the armature shall rotate relative thereto.

12. In an alternating current commutator motor, the combination of an internal compensating member, an external compensated member, a commutating connection between said members, and means for supplying alternating current to said compensated member, the ampere turns of the external member being relatively large in proportion to those of the internal member, said parts being so connected that the magnetic poles of the armature shall rotate relative thereto.

13. The combination with an alternating current circuit, of a motor comprising a field and a commutated armature of large inductance external to said field, said armature and field being connected to said circuit, and means for compensating the inductance of the armature.

14. A motor comprising the combination of a field and a commutated armature of large inductance external to said field, said armature and field being connected to said circuit, and means for compensating the inductance of said armature, said parts being so connected that the magnetic poles of the armature shall rotate relative thereto.

15. In an alternating current commutator motor, the combination of an external armature, an internal field, means for compensating the inductance of the armature, a commutator connected to such armature, and brushes carried by the field, said parts being so connected that the magnetic poles of the armature shall rotate relative thereto.

16. In an alternating current commutator motor, the combination of a stationary external armature, a rotary internal field, a commutator connected to such armature, rotary brushes connected to said field, and means for compensating the inductance of the armature, said parts being so connected that the magnetic poles of the armature shall rotate relative thereto.

17. The combination with a source of alternating current, of a motor consisting of an external armature, an internal field, both connected with said source of alternating current, there being a commutator connected to said armature, brushes carried by said field, and means for compensating the inductance of said armature, said parts being so connected that the magnetic poles of the armature shall rotate relative thereto.

18. The combination with a source of alternating current, of a motor consisting of an external armature, an internal field, both connected with said source of alternating current, a commutator connected to said armature, and brushes carried by said field, said armature and said commutator being stationary, said brushes being rotary, and means for compensating the inductance of said armature, said parts being so connected that the magnetic poles of the armature shall rotate relative thereto.

19. In an alternating current commutator motor, the combination of a stationary external armature, a rotary internal field, a stationary commutator connected to said armature, and having an internal contact surface for the brushes, rotary brushes connected to said field and adapted to make contact with said surface, and means for compensating the inductance of said armature, said parts being so connected that the magnetic poles of the armature shall rotate relative thereto.

20. In an alternating current commutator motor, the combination of a stationary armature, a rotary internal field, means for compensating the inductance of said armature, a stationary commutator connected to said armature, rotary brushes for said commutator, said brushes being connected to said field, collector rings connected to said field, and stationary brushes contacting with said collector rings, and adapted to be connected with a source of current, said parts being so connected that the magnetic poles of the armature shall rotate relative thereto.

21. The combination with a source of alternating current, of a motor consisting of a stationary external armature, a rotary internal field, said armature and field being connected with said source of alternating current, a stationary commutator connected to said armature, and having an internal contact surface for the brushes, rotary brushes connected with said field, and adapted to make contact with said surface, and means for compensating the inductance of the armature, said parts being so connected that the magnetic poles of the armature shall rotate relative thereto.

22. The combination with a source of alternating current, of a motor consisting of a stationary external armature, a rotary internal field, said field and armature being both connected with said source of alternating current, a stationary commutator connected to said armature, rotary brushes for said commutator, said brushes being connected to said field, said field being provided with collecting rings, stationary brushes contacting with said collecting rings and adapted to be connected with said source of current, and means for compensating the inductance of said armature, said parts being so connected that the magnetic poles of the armature shall rotate relative thereto.

23. In an alternating current commutator motor, the combination with an external armature and a commutator therefor, of an internal field member having diverging poles, and means for compensating the inductance of the armature.

24. In an alternating current commutator motor, the combination with a stationary external armature and a commutator therefor, of an internal rotary field member having diverging poles, and means for compensating the inductance of the armature.

25. The combination with a source of alternating current, and of a motor, said motor consisting of an external commutated armature, an internal field member having diverging poles, said armature and field both being connected with said source of alternating current, and means for compensating the inductance of the armature.

26. The combination with a source of alternating current, of a motor consisting of an external commutated armature, a core provided with coil slots radiating outward from its inner surface, an internal field member, both of said members being connected with said source of alternating current, and means for compensating the inductance of said armature.

27. In an alternating current commutator motor, the combination of an external armature having a core provided with coil-slots radiating outward from its inner surface, a commutator connected with said armature, an internal field member, and means for compensating the inductance of the armature.

28. In an alternating current commutator motor, the combination of external stationary armature having a core provided with slots radiating outward from its inner surface, a commutator connected with said armature, an internal rotary field member, and means for compensating the inductance of the armature.

29. The combination with a source of alternating current, of a motor consisting of an external stationary armature having a core provided with slots radiating outward from its inner surface, an internal rotary field member, and compensating winding for said armature, said winding being located on said field member.

30. In an alternating current commutator motor, the combination with an external armature, of an internal field member having poles and also having conductors situated in the poles, and so connected as to compensate or annul the inductance of the armature, and a commutator for causing the magnetic poles of the armature to rotate relative to the armature.

31. In an alternating current commutator motor, the combination with an external stationary armature, of an internal rotary field member having poles and also having conductors situated in the poles and so connected as to compensate or annul the inductance of the armature, and a commutator for causing the magnetic poles of the armature to rotate relative to the armature.

32. In a dynamo electric machine, the combination with an external armature, of an internal field member, compensating connections for said armature, said connections consisting of bars mounted in slots in the core of said field member and substantially parallel to the axis thereof, the corresponding bars on opposite sides of the poles being connected together, and a commutator for causing the magnetic poles of the armature to rotate relative to the armature.

In testimony that I claim the foregoing I have hereunto set my hand.

STANLEY S. SEYFERT.

Witnesses:
  EDWIN J. PRINDLE,
  KATHERINE E. LAWLOR.